Aug. 27, 1968  J. BONATSOS  3,398,664
COMBINED TELEVISION AND PHOTOGRAPHIC MACHINE
Filed Nov. 26, 1965  9 Sheets-Sheet 1
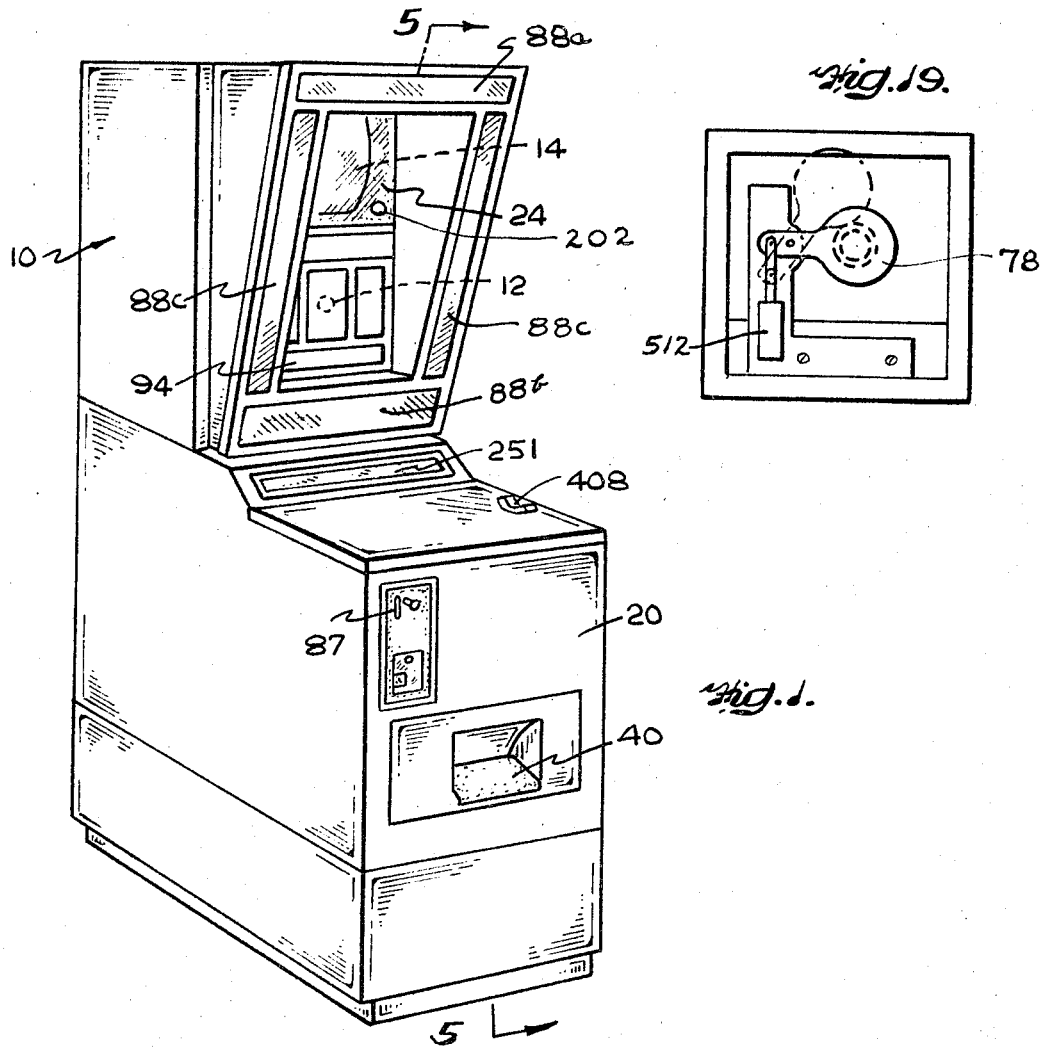
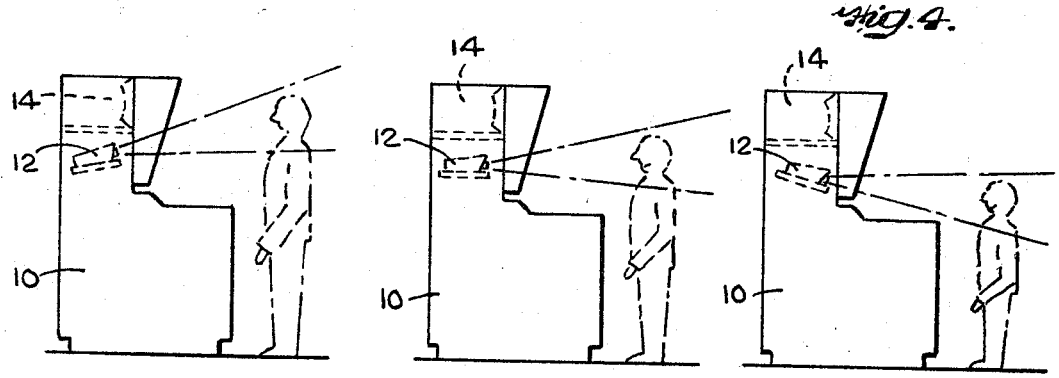
INVENTOR
JAMES BONATSOS
Peter Patane
HIS ATTORNEY

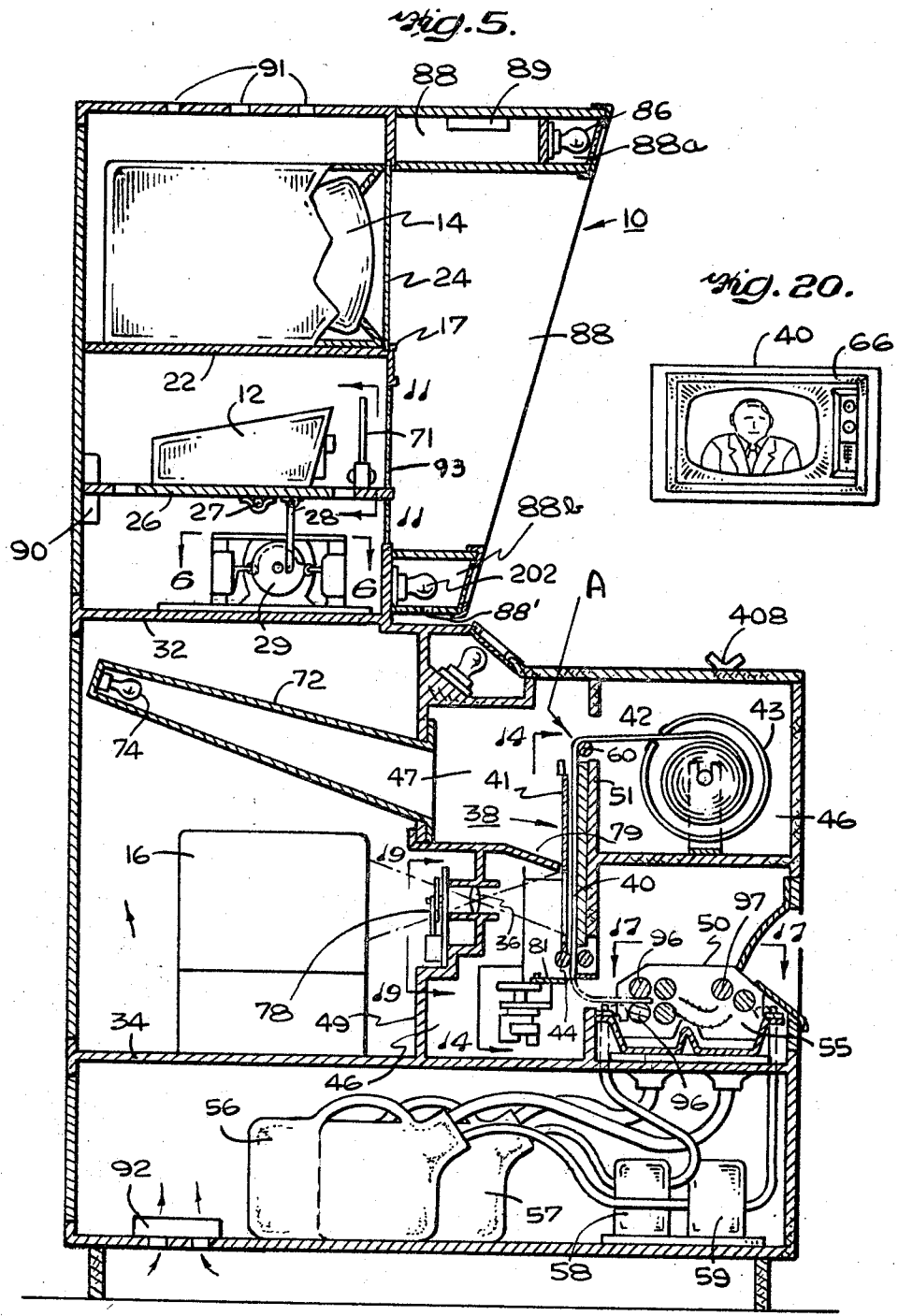

Aug. 27, 1968  J. BONATSOS  3,398,664
COMBINED TELEVISION AND PHOTOGRAPHIC MACHINE
Filed Nov. 26, 1965  9 Sheets-Sheet 3
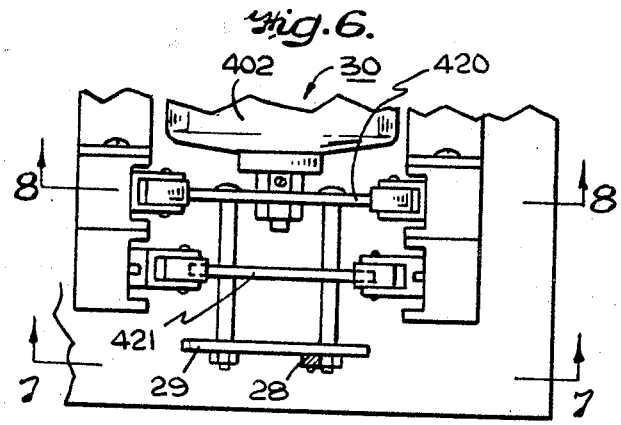
Fig. 6.
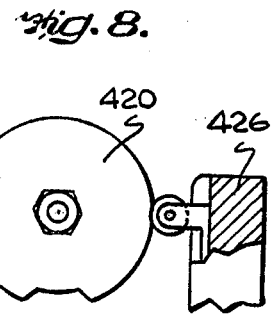
Fig. 8.
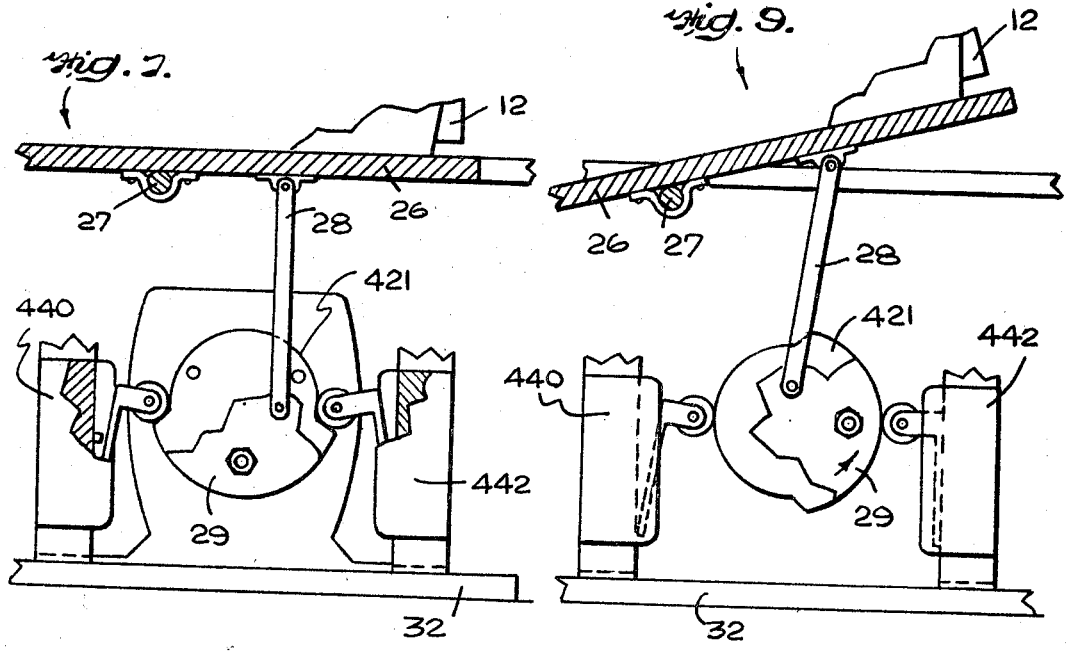
Fig. 7.  Fig. 9.
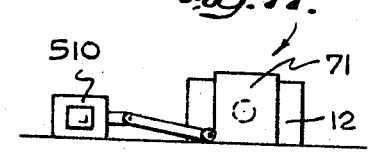
Fig. 11.
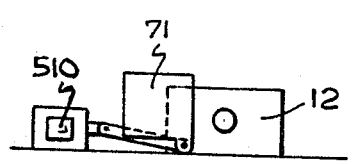
Fig. 12.
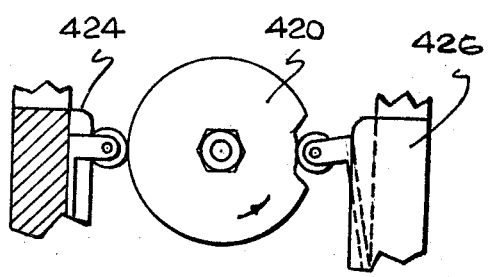
Fig. 10.
INVENTOR.
JAMES BONATSOS
BY Peter J Patane
HIS ATTORNEY

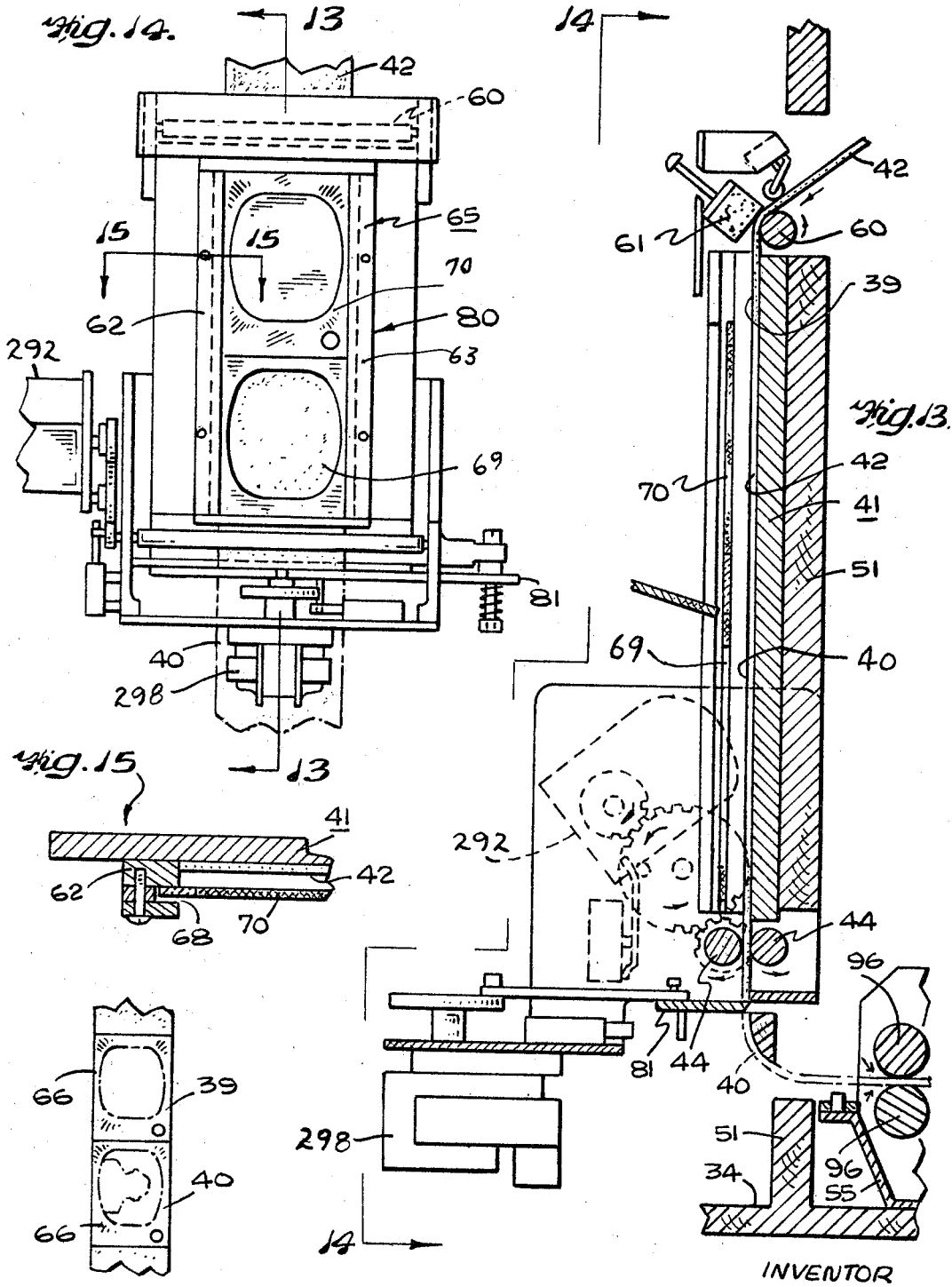

Aug. 27, 1968        J. BONATSOS        3,398,664
COMBINED TELEVISION AND PHOTOGRAPHIC MACHINE
Filed Nov. 26, 1965        9 Sheets-Sheet 5
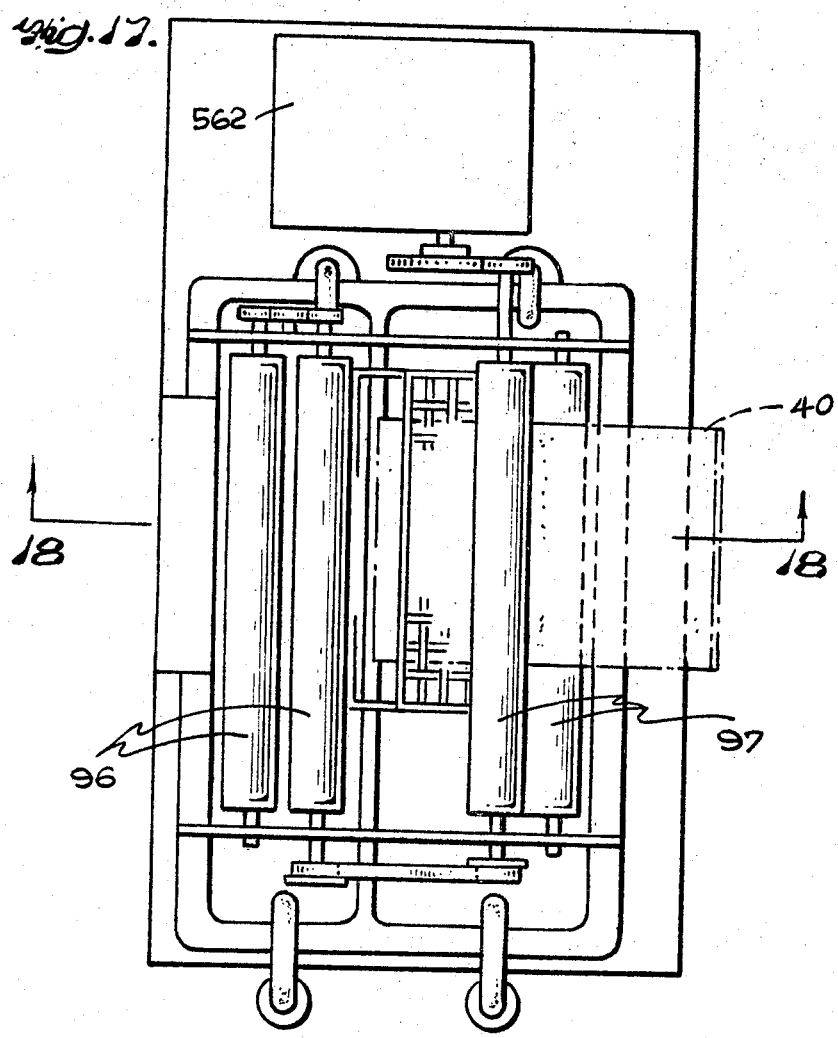
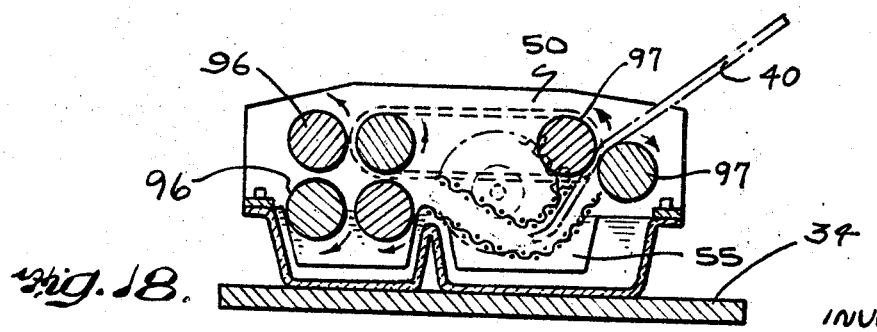
INVENTOR
JAMES BONATSOS
BY Peter Patane
HIS ATTORNEY

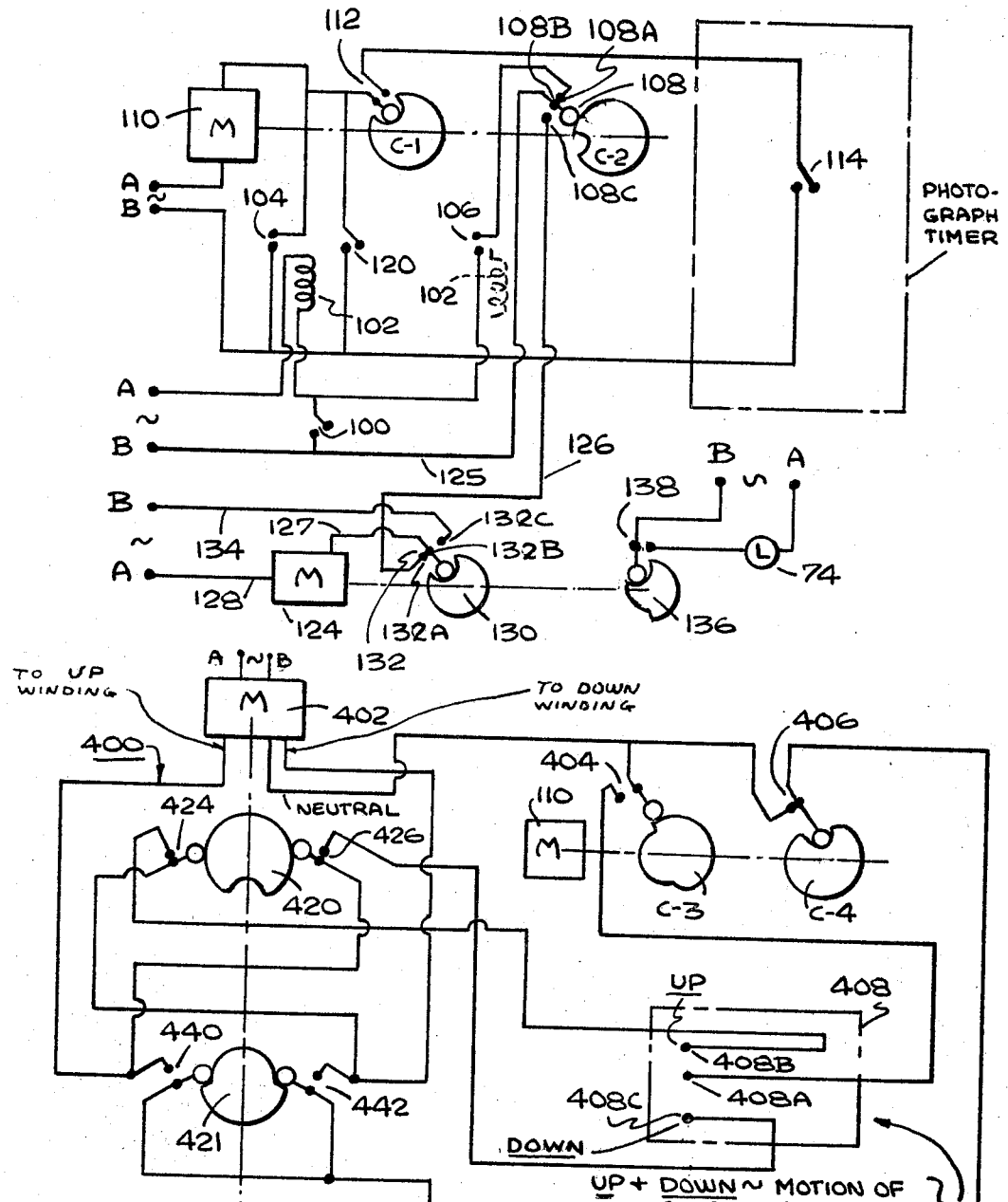
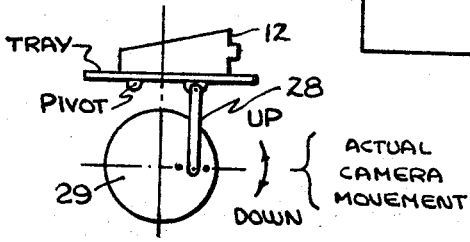

INVENTOR
JAMES BONATSOS
BY Peter Patane
HIS ATTORNEY

United States Patent Office 3,398,664
Patented Aug. 27, 1968

3,398,664
COMBINED TELEVISION AND PHOTOGRAPHIC MACHINE
James Bonatsos, Philadelphia, Pa., assignor to Radio Broadcasting Company, Philadelphia, Pa., a corporation of Pennsylvania
Filed Nov. 26, 1965, Ser. No. 509,784
15 Claims. (Cl. 95—14)

ABSTRACT OF THE DISCLOSURE

The system includes a television camera, a positive television monitor, and a negative television monitor. Both monitors are connected to receive signals from the camera. The positive television monitor enables the customer to view himself on a screen. Photographic equipment is connected with the negative monitor to produce a photograph showing the customer as he appeared on the positive television monitor. The system is actuated when a coin is deposited.

---

It is an object of this invention to provide a combined television and photographic system which is automatically operated and which is preferably initiated by insertion of a coin.

This invention comprises a television camera focused on the customer and connected to a positive television monitor, placed in a position to be viewed by the customer, and a negative television monitor within the cabinet of the machine. The negative television monitor is associated with a photographic system which dispenses to the customer a photograph showing how he appeared on the positive television monitor.

The cycle of operation is started when the customer inserts into the machine a coin. The television camera immediately picks up the image of the customer and the customer may see himself on the positive television monitor. For a short predetermined period of time the customer, by depressing a suitable rocker switch, may automatically vary the position of the camera up or down so as to best center himself vertically on the television screen. During this time he may notice the need to straighten his tie, for instance, and may do so.

During this period of time, the negative television monitor is also energized, but the cathode tube scanning beam is biased off by a sufficiently high negative bias to conserve the life of the tube. At the end of the predetermined time period, the negative bias is reduced sufficiently to permit a scanning beam on the tube, but only for the length of time required to give a correct photographic exposure for the paper and the developing chemicals being used.

The photograph is then chemically developed and automatically dispensed to the customer.

The foregoing and other objects of the invention, the principles of the invention, and the best mode in which I have contemplated applying such principles will more fully appear from the following description and accompanying drawings in illustration thereof.

Referring to the drawings,

FIG. 1 is a perspective view of the combined television and photographic machine showing the front and one side thereof;

FIGS. 2, 3 and 4 are side views of the machine shown in FIG. 1, but at a reduced scale relative to FIG. 1, and diagrammatically shows the television camera pivotally adjusted for a short person in FIG. 2, an average height person in FIG. 3, and a tall person in FIG. 4;

FIG. 5 is a vertical sectional view taken along the line 5—5 in FIG. 1, but at an enlarged scale relative to FIG. 1, and showing some of the internal parts diagrammatically;

FIG. 6 is an enlarged, partial top view taken along the line 6—6 in FIG. 5, showing the cams and switches associated with the motor for adjusting the television camera;

FIG. 7 is an end elevation, taken along the line 7—7 in FIG. 6, with part of the mechanism broken away for clarity, showing the normal position of the camera tray and cams;

FIG. 8 is a view taken along the line 8—8 in FIG. 6 showing the normal position as in FIG. 7;

FIGS. 9 and 10 are views similar to FIGS. 7 and 8 but showing the camera tray and cams tilted upwardly to better (vertically) center a tall person on the television monitors;

FIGS. 11 and 12 are front views, FIG. 11 being taken along the line 11—11 in FIG. 5, and show the camera flap in front of the camera lens in FIG. 11 and away from the lens in FIG. 12;

FIG. 13 is an enlarged, vertical sectional view of the photographic paper carrier, and associated mechanisms, which are also shown in FIG. 5 at a reduced scale, and is taken along the line 13—13 in FIG. 14;

FIG. 14 is an elevation of the carrier taken along the line 14—15 in FIGS. 5 and 13;

FIG. 15 is a partial, sectional view of the carrier taken along the line 15—15 in FIG. 14;

FIG. 16 is a diagrammatic, fragmentary view illustrating the sequence of exposure of the photographic paper;

FIG. 17 is a top view of the photographic developing tray and associated mechanisms;

FIG. 18 is a sectional view taken along the line 18—18 in FIG. 17;

FIG. 19 is a front elevation taken along the line 19—19 in FIG. 5 and showing the flap in front of the negative monitor;

FIG. 20 illustrates a typical photograph, at a reduced scale, dispensed by the machine; and FIGS. 21 to 27, inclusive, are diagrams showing various electrical circuits for controlling the operation of the machine.

Figure 23:
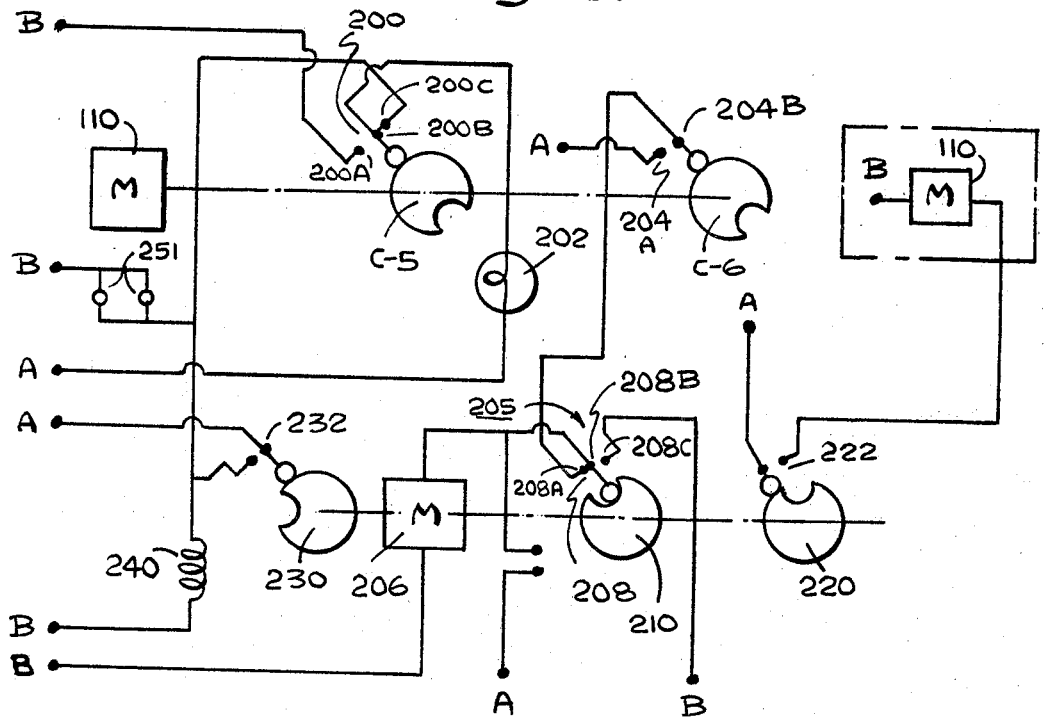

Referring to the drawings, FIG. 1 illustrates the combined television and photographic machine 10 which comprises a television camera 12 connected to a suitable electrical power supply and to a positive television monitor 14 (FIG. 5) and a negative television monitor 16.

The machine 10 comprises a cabinet 20 which includes an uppermost shelf 22 upon which rests the positive monitor 14. The monitor 14 is aligned with an opening 17 in the cabinet so that the monitor may be viewed by a person standing in front of the cabinet. The screen of monitor 14 may be protected by a suitable transparent panel 24, if desired.

Below the monitor 14 is placed the camera 12 suitably secured to a tray 26. The tray 26 rests on a shaft 27, the ends of which are carried by the cabinet 20, and the tray 26 is also connected to the right of the shaft 27, by a link 28 to an oscillatable plate 29. The link 28 and the plate 29 are parts of a camera tray control mechanism 30, to be described in greater detail hereinafter, for pivoting the camera up or down about the shaft 27, from (and back to) the normal position shown in FIGS. 3, 5, and 7, to accommodate taller or shorter persons, as shown in FIGS. 2, 4, and 9. As shown in FIG. 5, the tray control mechanism 30 sits upon a shelf 32 directly below the tray 26.

The field of the camera 12 is preset to focus on a person standing in front of the machine, as shown in FIGS. 2, 3, and 4.

In the lower half of the machine, as shown in FIG. 5, is placed the negative monitor 16 on a shelf 34. Cooperating with the negative monitor 16 is a photographic system 38 comprising a paper supply drum 43, a paper transport carrier 41, and a chemical developing system 50.

The negative image formed on the monitor 16 is focused by a lens 36 on a photographic paper section 40 received within the lower half of the carrier 41. The paper section 40 forms part of a long strip 42 supplied by the drum 43. The drum 43 is housed within a compartment 46, the carrier 41 being disposed in a space 47 intermediate the lens 36 and the drum 43, the space 47 being defined by vertical partitions 49 and 51 and parts of the cover 52 and shelf 34. After the image on the negative monitor 16 has been exposed on the paper section 40, two rollers 44 carry the section 40 past a knife 81 and the section 40 (now shown in dotted lines in FIG. 5) is cut by the knife 81 from the remainder of the strip 42. But before the section 40 is cut, its forward portion has entered the two rollers 96 of a photographic chemical developing system 50 disposed on the shelf 34 to the right of wall 51, as shown in FIG. 5.

The chemical developing system 50, in addition to rollers 96, comprises a tray 55 divided into a left-hand section for a developing fluid and a right-hand section for a stabilizing fluid, as seen in FIG. 5. The tray sections are supplied with suitable chemicals from containers 56 and 57 by pumps 58 and 59 connected by suitable tubes.

The photographic paper 42 is of the type that when exposed to a negative image, and then properly chemically developed, will produce a positive print. Referring to FIGS. 5, 13, 14 and 15, the strip of paper 42 is fed between a top roller 60 and a presser 61, down between opposed bars 62 and 63 past the two lower rollers 44.

The upper part of the carrier 41 is a projection printing station 65 because the image of a border 66, see FIGS. 16 and 20, is exposed onto the paper section 40 when it is in this station. The exposure of the border 66 is accomplished by placing in the upper half, FIG. 14, in tracks 68 formed by the bars 62 and 63, a photographic negative 70 of the border desired but opaque in the central area, i.e., a photographic negative representing the border 66 of a television set in the finished photograph, see FIG. 20.

A long, generally pyramidal, tube 72 is used to project a light beam from a pin-type, light source, i.e., a small, single filament electric light bulb, when it is desired to expose the negative 70 on the upper section 39 of the paper 42.

A shield 79 divides the compartment 47 into the upper projection part 65 and a lower lens part 80 and substantially prevents light from entering into the lower part 80 when the bulb 74 is illuminated.

Thus, when a cycle of operation starts, the section 40 of the paper 42 within the lower half of the carrier 41 has already been exposed to the negative of the border in the top half of the carrier 41 in the previous cycle. At the start of a cycle of operation, the flap 78 lifts from in front of the negative monitor 16 and thereafter the image on the monitor is exposed on the lower section 40 of the paper in the lower half of the carrier 41. A negative 69, which may be integral with the negative 70, is placed in the lower half of the tracks 68 and functions merely as a shield because the central portion is transparent to permit the image on the negative monitor to be exposed onto the photographic paper section 40, but its border, overlaying the border 66, is opaque.

Thus, it is seen that during each cycle of operation of the machine, two exposures are made on different sections of the paper strip 42. One exposure is of the border 66 on the upper section 39 of the strip 42 within the upper half of the carrier 41. The second exposure is of the image on the negative monitor 16 on the lower section 40 of the strip 42 within the lower half of the carrier 41. That is, the exposure on the lower section 40 is a second exposure on one section of the paper.

From the lens station 80, the paper strip 42 advances the full length of one picture beyond the knife 81 of a cutting station 82. That is, the paper section 40 travels past the knife 81 until its forward portion engages the rollers 48 at which time the knife 81 severs the section 40 from the rest of the paper.

The so severed section 40 next proceeds to the developing tray in which it is photographically developed.

Hence, during any one cycle, after the cycle is started by dropping a coin into the coin slot 87, FIG. 1, the paper advances but by the length of one photograph, i.e., from the projection station 65 to the lens station 80, but two separate exposures take place, one at the projection station 65 (which will be part of the photograph for the next customer) and a separate exposure takes place in the lens station of the customer who initiated the cycle.

Hinged, at one side, to the front of the machine is a light compartment 88 divided into upper, lower and side compartments 88a, 88b and 88c housing a plurality of lights 86 to illuminate the customer standing in front of the set. The lower compartment 88b has a bottom with holes in it to draw air which is pumped out the top of compartment 88a by a fan 89.

On the back of the cabinet is disposed another fan 90 to cool the interior thereof by exhausting air drawn in at the top through holes 91 and at the bottom through a filter 92.

Around the opening 93 for the camera 12 may be placed suitably illuminated signs 94 for giving directions to the customer.

Controls

The automatic control of the machine is accomplished by the circuits hereinafter described in detail. By way of introduction, the control system comprises a main timer which includes a motor 110 connected through suitable gears to eight cams, designated hereinafter as C-1 to C-8, all of the cams being disposed on the same shaft for joint rotation.

The photographic timer comprises a separate motor 206 which jointly rotates five cams 210, 220, 230, 250, and 270. By this arrangement, the length of the overall cycle may be controlled by motor 110 and its gearing independently of the photographic timer.

The camera tray 26 is adjusted up or down by the mechanism 30 which comprises a motor 402 and cams 420 and 421.

Stand-by condition

In the stand-by condition, the signs 94 are on but only part of the lights 86 are on. The cooling fans 89 and 90 are running at this time. The camera 12 and the two monitors 14 and 16 are on but the scanning beam of monitor 16 is biased off. The pumps 58 and 59 which supply the chemicals to the tray 35 are started every 15 minutes and run for about 2 minutes whether or not the machine is in use to avoid crystalization of the chemicals in the tray and on the rollers 96 and 97. The rollers 96 and 97 are rotated at this time to keep them continually moist, thereby avoiding crystalization of the developing and stabilizing chemicals on them and to insure that the entire photograph is developed during the next cycle.

The wiring diagrams

The wiring diagrams referred to hereinafter in detail are all representative of the condition of the switches, cams and other parts when the machine is in its stand-by condition, awaiting the insertion of a coin by a customer.

Operation

The cycle of the machine is initiated by a customer standing in front of the camera 12 dropping a coin in the slot 87.

The weight of the coin closes a switch 100, referring to FIG. 21, which energizes a coil 102, closing relay contacts 104 and 106. A switch 108, associated with cam C–2, is normally closed, so that the current path to coil 102 is maintained closed even though the switch 100 opens as the coin passes, thereby keeping switches 104 and 106 closed.

The closing of the switch 104 energizes the motor 110 and starts the rotation of the cams C–1 to C–8, inclusive. The switch 112 associated with the cam C–1 is normally open when its follower is at the low part of the cam (the stand-by condition), as shown. As the cam C–1 starts to rotate and the switch 112 is engaged by the high part of the cam, it closes, closing the circuit to the motor 110 through the switch 114 of the photograph timer control, the switch 114 being normally closed.

If desired, a switch 120 may be connected as shown, to initiate a cycle without dropping a coin into the coin slot.

The switch 108 remains closed until the motor 110 rotates the cam C–2 until the low part of the cam comes opposite the follower of the switch 108, at which time the contacts 108A and 108B open and the contacts 108B and 108C close. The opening of the contacts 108A and 108B deenergizes the coil 102, opening the switches 104 and 106.

The closing of the contacts 108B and 108C closes the circuit to the motor 124 through the conductors 125, 126, 127, and 128. The contacts 108B and 108C are closed only for a short period of time, the time that the follower of switch 108 is opposite the low part of the cam.

The projection of the image of the border 66 onto the section of the paper in the upper half of the carrier 41 is made under the control of a separate motor 124 which starts the rotation of a cam 130 and immediately raises the follower of a switch 132 to the high part of the cam 130, opening contacts 132A and 132B and closing the contacts 132B and 132C, so that the motor 124 is now energized through the conductors 128, 127, contacts 132B and 132C and the conductor 134. The motor 124 also rotates another cam 136 associated with a switch 138 which is closed when its follower is opposite the low part of the cam 136 at which time the circuit to the lamp 74 closes to expose the image of the border onto the photographic paper.

*Camera tray control mechanism*

With the insertion of the coin by the customer and until the red light 202 becomes illuminated, the customer may adjust the camera up or down by depressing one side or the other of a rocker switch 408 forming part of the camera tray control mechanism 30. The camera tray control mechanism is associated with cams C–3 and C–4 which are rotated by the main timer motor 110, see FIG. 22.

The camera tray control mechanism includes a reversible electrical motor 402, FIGS. 6 and 22. In the stand-by condition of the machine, FIG. 22, the switch 404 associated with the cam C–3 is open and its follower is on the high part of the cam, as shown. The switch 406 associated with the cam C–4 is closed and its follower is on the low part of the cam as shown.

In the stand-by condition, the camera tray is in the normal or horizontal position shown in FIG. 7 which is intended to correspond to the height of an average person.

As soon as the cams C–4 and C–3 start to rotate, first the switch 406 opens, as the high part of the cam C–4 comes opposite the follower of the switch 406, and then immediately thereafter, the switch 404 closes, as the low part of the cam C–3 comes opposite the follower of the switch 404.

The closing of the switch 404, closes the circuit to the rocker switch 408. The rocker switch 408 has a central contact 408A which is connected to the common or neutral wire of the motor 402 through the closed switch 404.

Associated with the motor 402 and rotatable jointly first in one direction and then in the opposite direction are cams 420 and 421 and plate 29. The cam 420 has a central, low part and on opposite sides thereof, on the high part of the cam, as shown, are disposed the followers of limit switches 424 and 426.

If the customer is tall, he will want to lower his image on the screens, and he will press the part of the rocker labeled "Down" on the cabinet, i.e., he will close contacts 408A and 408C, and the circuit to the "up" windings of the motor 402 will be closed, through the switch 426, rotating the motor in the up direction, counterclockwise, whereby the motor rotates plate 29 counterclockwise, moving the link 28 up, and consequently pivoting the tray 26 counterclockwise about its pivotal mounting shaft, see FIG. 9.

If the contacts 408A and 408C are kept closed, the motor 402 will rotate the cams 420 and 421 and with them plate 29, to the limiting position, i.e., the maximum upward tilt position of the tray, shown in FIG. 9. This limiting position is the position at which the follower of switch 426 drops into the low part of the cam 420, opening the contacts of switch 426.

Note that the follower of switch 424 is still on the high part of the cam 420, at this time, and if the customer has caused the camera to overtravel, he may, by now depressing part of the rocker button labeled "Up," close contacts 408A and 408B, energizing the "down" windings of the motor 402, through the contacts of switch 424, to return the camera toward the desired position.

However, the customer may pivot the camera only for a predetermined period of time, that is, a time period ending just before the exposure is made onto the photographic paper of the image on the negative monitor 16. This is accomplished by opening the switch 404, due to the cam rotating, so that a high part of the cam is opposite the follower of switch 404, and this takes place just before the exposure is made, preferably about one second before the exposure is made. The switch 404 remains on the high part of the cam C–3 for the remainder of the cycle, thus the camera tray can no longer be moved after the exposure is made.

The camera tray 26 is returned to the normal position while the follower of the switch 406 is opposite the low part of the cam C–4, and preferably as the cam C–4 rotates toward its stand-by position, since the follower of the switch 406 remains opposite the low part of the cam C–4 when the cam C–4 is in the stand-by position, the position shown in the diagram, by the cam 421 and its switches 440 and 442.

The cam 421 has a low part which extends about halfway around the periphery of the cam and a high part extends around the remainder of the cam 421. In the stand-by position, shown in the diagram, both switches 440 and 442 are open and opposite the low part of the cam, one switch at each end thereof.

If the customer has moved the tray up, the switch 442 will be closed, because its follower has moved onto the high part of the cam, but the switch 440 is still open as its follower is still on the low part of the cam, and upon the closing of the switch 406, the "down" windings of the motor are energized, return the camera tray to the normal position, and the motor becomes deenergized at such time because both switches 440 and 442 are open and opposite the low part of the cam.

As the cam C–3 rotates, of course, the cam C–4 also rotates and maintains the switch 406 open until just before the end of the cycle, and in the stand-by position, the switch 406 is opposite the low part of the cam and closed.

Preferably the adjustment of the low part of the cam C–4, relative to the cam C–1, is such that the switch 406 closes just before the motor 110 stops, but since the motor 402 is energized in a separate circuit from the motor 110, once the switch 406 closes, the circuit to the motor 402 will be closed.

While only the upward pivoting of the tray 26 has been described it is seen that a similar downward pivotal motion of the tray can be accomplished with a similar automatic return to the normal position of the tray.

*Photographic timer control and exposure of image on negative monitor*

About six seconds after the coin has been inserted, the motor 110 rotates the cam C–5, FIG. 23, until the low part of the cam is opposite the follower of the switch 200. Contacts 200B and 200C open and the contacts 200A and 200B close. The red light 202 is energized, and remains energized for about a second. During the time the red light 202 is on, the low part of cam C–6 comes opposite the follower of the switch 204 and the contacts 204A and 204B close, the motor 206 of the photographic timer control 205 being now energized through contacts 208A and 208B of a switch 208 which is actuated by a cam 210 rotated by the motor 206. As soon as the cam 210 is rotated sufficiently, the contacts 208B and 208C are closed to maintain the motor 206 energized.

Rotation of the motor 206 rotates the cam 220 which controls a switch 222 to open the circuit of the main timer motor 110. The main timer motor 110 will be reenergized when the cam 222 has gone through almost one revolution, at which time the follower of the switch 222 is again opposite the low part of the cam 220 and the switch 222 closes.

Meanwhile, the cam 230 has been rotated so that the follower of switch 232 drops into the low part of the cam 230, closing its contacts. The closing of switch 232, closes the circuit to the relay coil 240 which is part of the control circuit for the electronic shutter 249, see FIG. 24, to the two spotlights 251, and to the red light 202.

Figure 24:
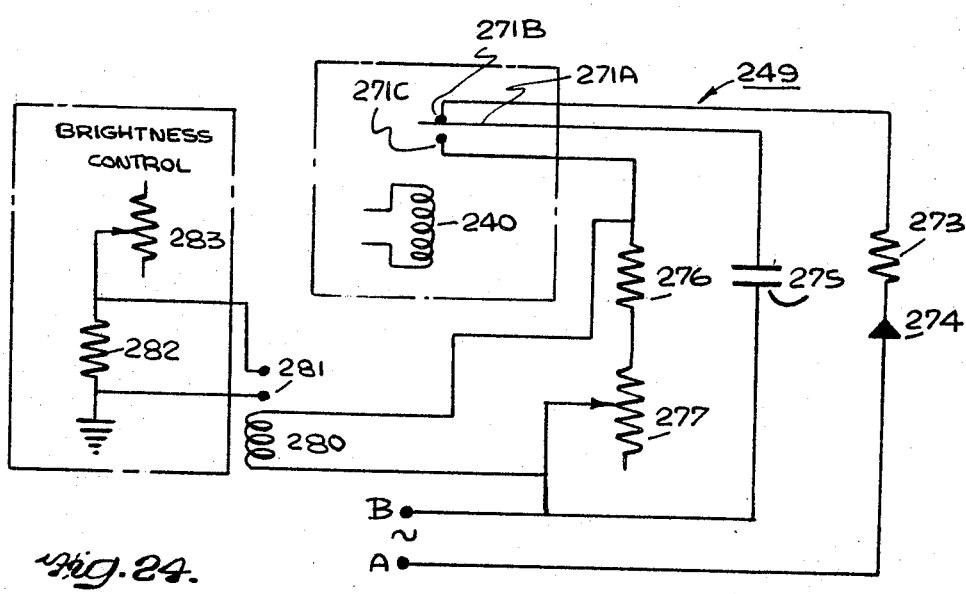

Referring to FIG. 24, the electronic shutter comprises a capacitor 275 which is charged through normally closed contacts 271A and 271B, a current limiting resistor 273, and a diode 274, as shown. When the coil 240 is energized, as previously described, contacts 271A and 271B open and contacts 271A and 271C close, discharging the capacitor 275 across a fixed resistor 276 and a variable resistor 277. The voltage across resistors 276 and 277 due to this discharge energizes a coil 280 which closes the contacts of a normally open switch 281.

The switch 281 is connected across a resistor 282 which has one end connected to ground and the other end variably connected to one end of a resistor 283. The resistor 283 is the one in a monitor which is varied to vary the brightness of the picture on the negative monitor, i.e., the resistor 283 controls the negative bias on the cathode tube of the negative monitor. When the resistor 282 is in series with the resistor 283, the negative bias is so high as to cut off the scanning beam of the tube.

The time period during which the resistor 282 is taken out of the circuit depends on the time period for which the contacts 281 remain closed which in turn depends on the time required for the charge of the capacitor to dissipate itself. Thus, the time of exposure of the image on the negative monitor upon the photographic paper may be varied by varying the setting of resistor 277.

*Paper advancing and cutting*

Figure 25:
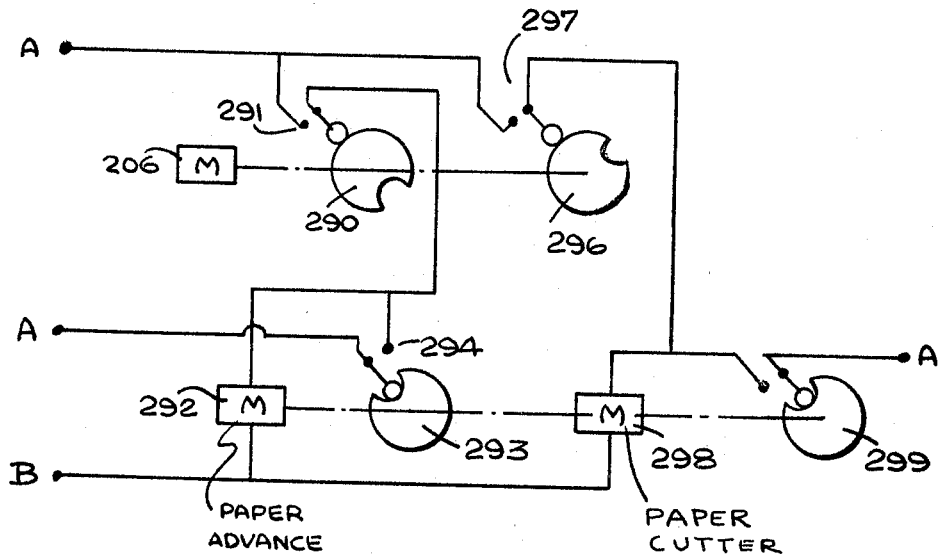

Referring to FIG. 25, connected to the shaft driven by photographic timer motor 206, is a cam 290 which is associated with a normally open switch 291, as shown. After a sufficient time period, the low part of the cam 290 comes opposite the follower of the switch 291, closing the contacts thereof for a sufficient time to start the paper advance motor 292. Rotation of the motor 292 drives the rollers 44, rotates a cam 293 which immediately closes a switch 294 to maintain the motor 292 energized, since the switch 291 has opened in the meanwhile. The paper is advanced by the motor 292 so long as it is energized, i.e., until the cam 293 completes one revolution at which time switch 294 opens.

Further, another cam, cam 296 is also rotated by the motor 206 and is set so that it will close a switch 297 after the paper has been advanced. The closing of switch 297 energizes the motor 298 of a paper cutter, which swings the knife 46 to cut the section 40 from the strip 42. The paper cutter motor rotates a cam 299 to deenergize the motor 298 after completion of the cutting.

If desired, after the paper advance and cutter motor complete their cycles, there may be a back E.M.F. impressed on the motors 292 and 298 to brake them and prevent overtravel. The details of these back E.M.F. circuits are not shown.

*Lights and coin acceptor*

Figure 26:
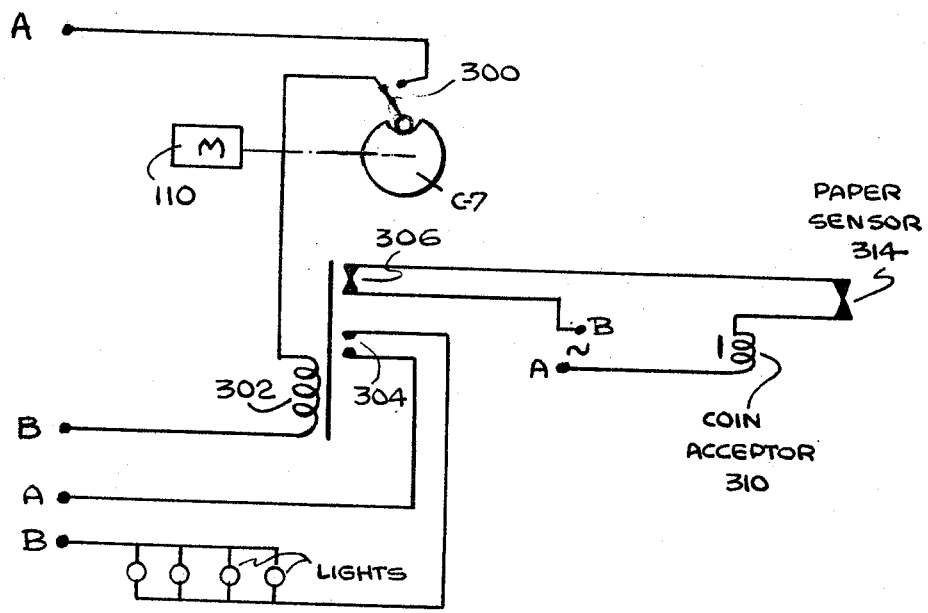

Referring to FIG. 26, at the beginning of the cycle, about one second after the coin is inserted into the machine, the main timer motor 110 rotates the cam C–7 until the high part of the cam is opposite the follower of switch 300 at which time its contacts close, energizing coil 302 and closing the contacts of switch 304. The closing of switch 304 energizes the circuit to the remainder of the lights at the front of the machine further illuminating the customer.

Also, energization of the coil 302 opens switch 306 to deenergize the coil 310. The coil 310 forms part of the coin acceptor and is normally energized. Upon the insertion of a coin, if the coil 310 is energized, the coin will be accepted. Upon deenergization of the coil 310, if a coin is inserted subsequently, the coin will be rejected. Also, in the circuit of the coil 310 is a switch 314 which is normally closed so long as there is photographic paper in the machine. If the paper becomes exhausted, the switch 314 opens, deenergizing coil 310, so that even in the standby condition, coins will also be rejected, if the paper is exhausted.

*Pumps, processor rollers and flaps*

Figure 27:
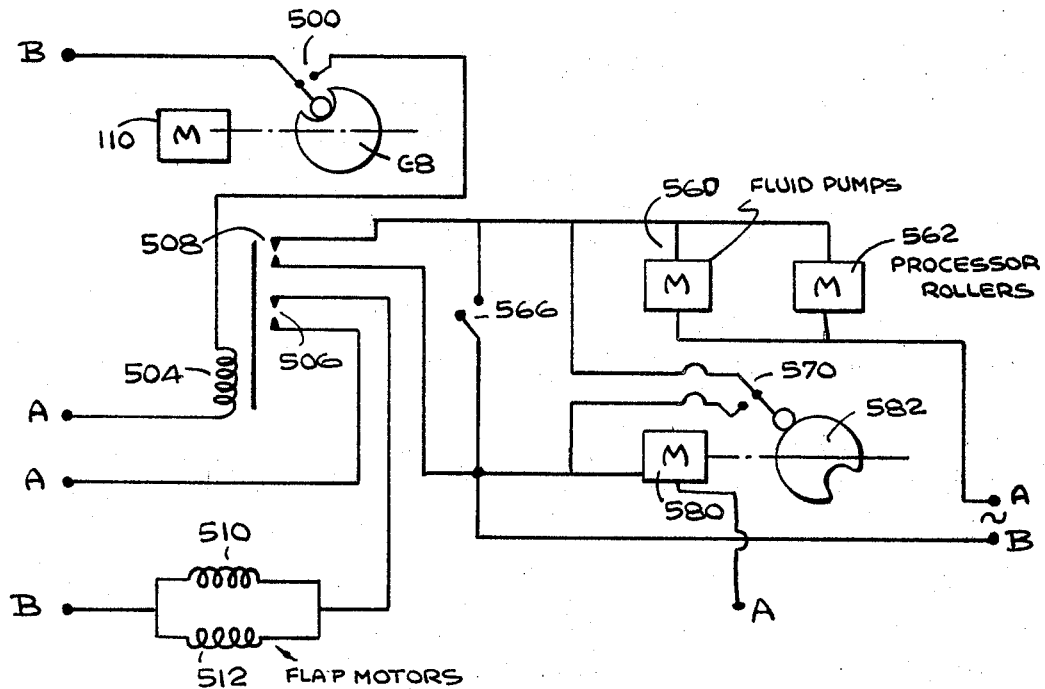

Referring to FIG. 27, the cam C–8, when the motor 110 starts to rotate, lifts the follower of the switch 500 onto the high part of the cam C–8, closing the contacts thereof and energizing the coil 504. Energization of the coil 504, closes the switches 506 and 508.

The closing of switch 506 energizes the solenoids 510 and 512 which lift the flaps 71 and 78 in front of the television camera and the negative monitor, respectively. These solenoids are deenergized when, at the end of the cycle, the follower of switch 500 drops into the low part of the cam again, opening the contacts of switch 500.

Since the contacts 508 have also been closed, rotation has started of the motors 560 for the pumps 58 and 59 and the motor 562 for the rollers 96 and 97 which grasp the paper and moisten it with the chemicals in the tray 55.

In electrical parallel with the switch 508 is a toggle switch 566 which when closed will keep the motors 560 and 562 deenergized continuously, as may be desired when the unit is serviced.

Also, in electrical parallel with the switch 508 is a further switch 570. The switch 510 is controlled by a separate motor 580 and a cam 582. The motor 580 is energized continuously and rotates the cam 582 one revolution about every 15 minutes. The follower of the switch 570 stays in the low part of the cam 582 about two minutes during every revolution of the cam. When the follower is in the low part of the cam 582 the switch 570 is closed, energizing the motors 560 and 562. Therefore, the chemicals will be recirculated at least every fifteen minutes whether or not the machine is used by a customer.

*Miscellaneous*

The letters A and B (without numerals) have been used in the diagrams to designate opposite sides of suitable sources of alternating current.

In the monitors, the connections to the horizontal deflection coils have been reversed to provide a mirror image at the positive monitor and a mirror negative image at the negative monitor so that the photograph projected from the negative monitor will result in a positive photograph.

The monitors and camera are connected to a suitable source of power and are on a separate power circuit, but the negative monitor is controlled as heretofore described.

The two motors 110 and 206 are used because the timing of the time the person can see himself, the time he can adjust the camera, etc., may be varied, as desired, by replacing a gear, i.e., by changing the speed of the shaft on which the cams are mounted. If an individual time period is to be changed relative to the other time periods, then the shapes of the cams must be changed.

Assuming the machine to be in the stand-by condition, and that the motor 402 is connected to a power source, if the camera tray is physically moved from the normal position shown in FIG. 7 to, for instance, the position shown in FIG. 9, the switches 440 and 442 will return the tray to the normal position of FIG. 7.

*Summary*

With the machine in the stand-by condition, the cycle is initiated by inserting a coin into the coin slot. Immediately the flaps in front of the camera and negative monitor are lifted, additional lights are illuminated, and the customer may see himself on the positive monitor. Also, virtually at the same time, the motors for the pumps and the developing processor rollers are energized.

The negative monitor, at this time, is receiving a signal from the camera, but since its scanning beam is biased off, no image is formed on the screen of the negative monitor.

Also, at this time, an exposure is made of a border on a section of the photographic paper. This section of the paper will be advanced, during this cycle, and used in the next cycle to receive the image from the negative monitor.

The main timer determines a time period during which the customer may raise or lower the camera by pressing the rocker switch. This time period ends when a red light signals the customer to hold steady.

At this time a photographic timer energizes a circuit, removing the bias on the negative monitor, and the image on the negative monitor is exposed onto a section of positive photographic paper.

Further, after the exposure of the image on the negative monitor is made, the paper advances, is cut and travels to a developing processor where it is chemically developed and dispensed to the customer.

The timer motor suspends its sequential operation at the end of the mentioned time period and resumes its sequential operation after the paper has been advanced and cut.

During the mentioned time period, the customer may adjust the camera but at the end of the time period, the camera cannot be moved and remains in whatever position it is in, until just before the cycle terminates at which time the camera is returned to the normal position, if it has been moved therefrom. During and after the exposure of the image on the negative monitor, the customer may see himself on the positive monitor, but cannot change position of the camera.

Having described this invention, what I claim is:

1. In combination a television camera, a positive television monitor and a negative television monitor connected to receive signals from said camera, and a photographic means associated with said negative monitor to produce a photograph showing the customer as he appeared on the positive television monitor, said camera, monitors and photographic means being housed within a cabinet, and said positive monitor being visible through an opening in said cabinet.

2. The combination recited in claim 1 wherein said photographic means comprises a supply of photographic paper and an arrangement whereby the image on said negative monitor is exposed onto a section of said paper, and second means for developing and dispensing only the so exposed part of said paper.

3. The combination recited in claim 1 and further including a third means for receiving a coin and initiating operation of said machine.

4. The combination recited in claim 1 and further including a third means for exposing on a section of the photographic paper a decorative border within which the exposure of the image on the negative monitor is to be received.

5. The claim 14 structure and a mechanism for pivoting said television camera comprising, a tray pivotally supporting said camera, an oscillatable plate, a link pivotally connected at one end to said plate and at the other end to said tray, a reciprocable motor connected to said plate to oscillate the latter, first means for energizing said motor to oscillate said plate in opposite directions, second means to return said plate to its initial position, and third means to deenergize said first means and energize said second means.

6. A paper transport system for a photographic system comprising first means for storing photographic paper, a carrier for receiving a strip of photographic paper from said first means, a second means for exposing an image onto a section of said paper in a portion of said carrier, a third means for advancing said paper relative to said carrier, a television monitor means for exposing a second image onto another section of said paper, and a cutting means for severing said paper section from said strip after it is advanced by said third means.

7. The structure recited in claim 6 and further including a photographic chemical developing means for receiving said paper section after it is severed from said strip and photographically developing it.

8. The structure recited in claim 6 wherein said television monitor means includes a negative monitor.

9. The structure recited in claim 8 and further including a television camera and positive monitor, whereby a customer may see himself on television and reecive a photograph showing how he appeared on the positive monitor.

10. The structure recited in claim 9 and further including flaps blocking said television camera and negative monitor when the camera and negative monitor are not in use.

11. The structure recited in claim 9 wherein said negative monitor comprises a cathode tube having a scanning beam biased off except for the time that the image of the negative monitor is to be exposed onto the paper section.

12. The structure recited in claim 9 and further including a control means for raising and lowering the television camera to accommodate persons of different heights.

13. In a television and photographic machine comprising a television camera suitably connected to a negative monitor and a positive monitor in combination wth an integrated photographic system, the combination of a main timer means including a plurality of switches actuated in sequence and controlling the cycle of said machine, and a photographic timer means including a plurality of switches actuated in sequence, said photographic timer means controlling said photographic system independently of said main timer means in that upon exposure of the image on the negative monitor onto said photographic system further sequential operation of said main timer is suspended until said photographic system arrives at a predetermined step in its operation at which time sequential operation of the main timer automatically resumes, whereby the time cycle of the photographic system is independent of the sequence of operation of the main timer.

14. In combination a television camera, first and second television monitors connected to receive signals from said camera, and a photographic means associated with the second television monitor to produce a photograph showing the customer as he appeared on the first television monitor, a cabinet housing said camera, monitors and photographic means, and said cabinet having an opening through which said first monitor is visible.

15. The combination recited in claim 14 and further including coin means for receiving a coin and initiating operation.

References Cited

UNITED STATES PATENTS

| | | | |
|---|---|---|---|
| 2,473,174 | 6/1949 | Pifer | 95—14 |
| 2,769,369 | 11/1956 | Oiler | 95—14 X |
| 3,164,838 | 1/1965 | Heinrich | 95—86 X |

NORTON ANSHER, *Primary Examiner.*

GARY M. HOFFMAN, *Assistant Examiner.*